United States Patent [19]
Girard et al.

[11] 4,315,403
[45] Feb. 16, 1982

[54] AERO-HYDRAULIC GENERATOR AND A HEAT RECOVERY INSTALLATION INCLUDING SUCH A GENERATOR

[75] Inventors: Edmond Girard, Boulogne; Robert Rey, Fresnes, both of France

[73] Assignee: Messier, Paris, France

[21] Appl. No.: 3,383

[22] Filed: Jan. 15, 1979

[30] Foreign Application Priority Data

Feb. 2, 1978 [FR] France .................. 78 02846

[51] Int. Cl.³ ........................................... F01K 27/00
[52] U.S. Cl. ..................................... 60/643; 417/271;
                                                 417/405; 415/500
[58] Field of Search ............... 60/643, 650, 682, 408;
                            415/500; 417/237, 271, 405; 290/43, 54

[56] References Cited

U.S. PATENT DOCUMENTS

| 984,599 | 2/1911 | Pichault | 417/271 X |
| 2,373,723 | 4/1945 | Wahlmark | 417/271 |
| 3,274,768 | 9/1966 | Klein | 417/271 X |
| 4,149,092 | 4/1979 | Cros | 290/43 X |

FOREIGN PATENT DOCUMENTS 307820   5/1933   Italy ..................... 417/405

Primary Examiner—Allen M. Ostrager
Assistant Examiner—Stephen F. Husar
Attorney, Agent, or Firm—McAulay, Fields, Fisher, Goldstein & Nissen

[57] ABSTRACT

A reversible aero-hydraulic generator capable of operating as a turbo-pump or as a motor-compressor, and a heat energy recovery installation including such a generator.

The generator comprises a positive displacement pump (5) and an axial turbine (6) tandem connected and coupled by their respective shafts (23 and 11) so that one can drive the other directly and disposed within a single sleeve (1) having end connecting flanges (3 and 4), whereby the sleeve can be directly inserted within a conduit for a first fluid, in the gaseous or vapor phase state, so that the first fluid can pass axially through the sleeve (1), and inlet and outlet conduits (31 and 32) for a second fluid in the liquid or vapor phase, for the pump (5), the conduits (31, 32) passing through the sleeve (1). A heat recovery installation can comprise such a generator for the recovery of heat energy from a drier for printing ink with the pump output used to drive a hydraulic motor to assist in driving the rollers of a printing press.

11 Claims, 2 Drawing Figures

AERO-HYDRAULIC GENERATOR AND A HEAT RECOVERY INSTALLATION INCLUDING SUCH A GENERATOR

The invention relates to an aero-hydraulic generator and particularly though not exclusively to a heat recovery installation including such a generator.

Heat recovery installations which are in use at the present time can be classified in two main categories.

The first category seeks to provide for the recovery, in the form of mechanical or electrical and/or heat energy which can be used directly, of heat energy which cannot be used directly or which is even parasitic, and which is generally produced in the production of electrical or mechanical energy from a fuel, or which occurs in the form of losses which always accompany the production of heat energy when put to use.

The unusable or parasitic heat energy can comprise a heat source from which is drawn heat which is received at the boiler of a closed-circuit steam engine, by a driving or primary fluid, which may be water, the vapour of which drives a turbine and is condensed in a condenser, being cooled by the transfer of heat, for example to a heating system.

The mechanical power available at the shaft of the turbine may be used to drive an alternator, a pump, even a compressor, for example a heat pump, and the electrical or mechanical energy which is recovered can thus reduce the consumption of the producer of the parasitic or unusable heat energy, which forms the heat source. In installations which fall into this first category, an essential component is a turbo-alternator, turbo-pump or turbo-compressor assembly.

The second category seeks to transfer quantities of heat from a cold source, which will be further cooled, to a hot source, which will be further heated, this being achieved by means of heat pumps whose evaporator receives heat originating from the cold source and whose condenser transfers heat to the hot source, the cooling fluid of the heat pump being compressed between the evaporator and the condenser by a compressor which is driven by a power-consuming motor. In the installations which fall into this second category, an essential component is a motor-compressor assembly.

However, known turbo-alternator, turbo-pump, turbo-compressor or motor-compressor assemblies suffer from the disadvantage that they comprise two separate components connected by a transmission shaft. Problems therefore arise with regard to leaks from the interior of each of the two components, to the exterior, where the shaft extends out of the respective components, and this makes it necessary to have recourse to sealing means (seals and/or labyrinth means), which cause mechanical losses, in particular due to friction.

Moreover, such assemblies, with two separate components, are bulky and accordingly suffer from a low power-to-weight ratio.

Finally, as the fluid for driving the assembly may be steam and as one of the components operates on a carnot cycle, obtaining an acceptable output presupposes the use of steam which has substantial temperature differences between the boiler and the condenser. As high-temperature steam is corrosive and must circulate at high pressure in conduits, it is necessary to use noble and accordingly expensive metals, for at least some of the components of the assembly.

According to the invention there is provided an aero-hydraulic generator capable of operating in a turbo-pump or motor-compressor mode, comprising a positive displacement hydraulic pump capable of operating as a positive displacement hydraulic motor and an axial turbine capable of operating as an axial compressor disposed in tandem and coupled by their respective shafts with a direct drive connection within a single sleeve having end connecting flanges whereby the sleeve can be directly inserted in a conduit for a first fluid, in the gaseous state or vapour phase, which first fluid can thereby pass axially through the sleeve, and an inlet conduit and an outlet conduit for a second fluid in liquid or vapour phase, for the pump, said inlet and outlet conduits passing through the sleeve in a substantially radial direction.

Such a generator is particularly suitable for the recovery of industrial or domestic heat drawn from the change of state of a driving fluid which may be water or preferably a fluid with a low boiling point.

Thus in use of the generator the hydraulic pump or motor generally will have a hydraulic flow passing therethrough, and the axial turbine or compressor a gas flow passing therethrough.

Preferably, the turbine comprises at least one pair of bladed wheels, one stator wheel of which is disposed on the pump side, is secured by way of its periphery with respect to the sleeve and carries a sealed bearing assembly forming a support bearing for the shaft of the turbine, while the other, rotor, wheel is fixed with respect to the shaft, the blades of the rotor wheel and stator wheel being of identical profile but reversed setting.

Without requiring other sealing joints or packings, the generator can avoid any leakage to the exterior, by virtue of the single sleeve in which the pump and the turbine are housed. Moreover, by virtue of the sealed bearing assembly carried by the stator which is disposed closest to the pump, there need be no significant hydraulic leakage from the pump towards the turbine.

The particular structure of the turbine and the coupling thereof to the pump within a single sleeve can make the resulting assembly extremely compact and the aero-hydraulic generator can consequently have a good power-to-weight ratio. More-over, providing the blades of the rotors and stators of identical profile, can simplify production of the rotors and stators and thereby reduce the cost of the generator.

When particularly advantageously used for the recovery of heat, drawn from the change of state of a low-boiling point cooling fluid, the aero-hydraulic generator can make it possibly, by means of a combination which is adapted to the number of stages of the turbine, the height of the blades and their profile, to recover the heat which is drawn from a vapour at low temperature, which a small temperature difference between the inlet and the outlet of the turbine, whereby, in addition to the intrinsic advantage that this provides from the point of view of the uses to which the generator is put, it is possible to produce the generator from materials such as ordinary steels and alloys.

Installations for recovering the heat energy which is dissipated by a heat source and which is collected, in a boiler or evaporator, by a primary fluid whose vapour, passing through at least one of the aero-hydraulic generators will drive its turbine which will in turn drive the hydraulic pump to supply hydraulic fluid under pressure to at least one hydraulic motor can present the energy recovered in the form of mechanical power.

In the case of a low-temperature heat source, the primary fluid of the installation will advantageously be a cooling fluid with a low boiling point.

Installations for recovering heat energy, can comprise at least one heat pump, the aero-hydraulic generator, operating as a motor-compressor unit, acting as the compressor of the heat pump and being driven by the hydraulic motor which is supplied with hydraulic fluid under pressure from a pump external to the generator.

The invention is diagrammatically illustrated by way of example in the accompanying drawings, in which:

DESCRIPTION OF THE PREFERRED EMBODIMENT

Figure 1:
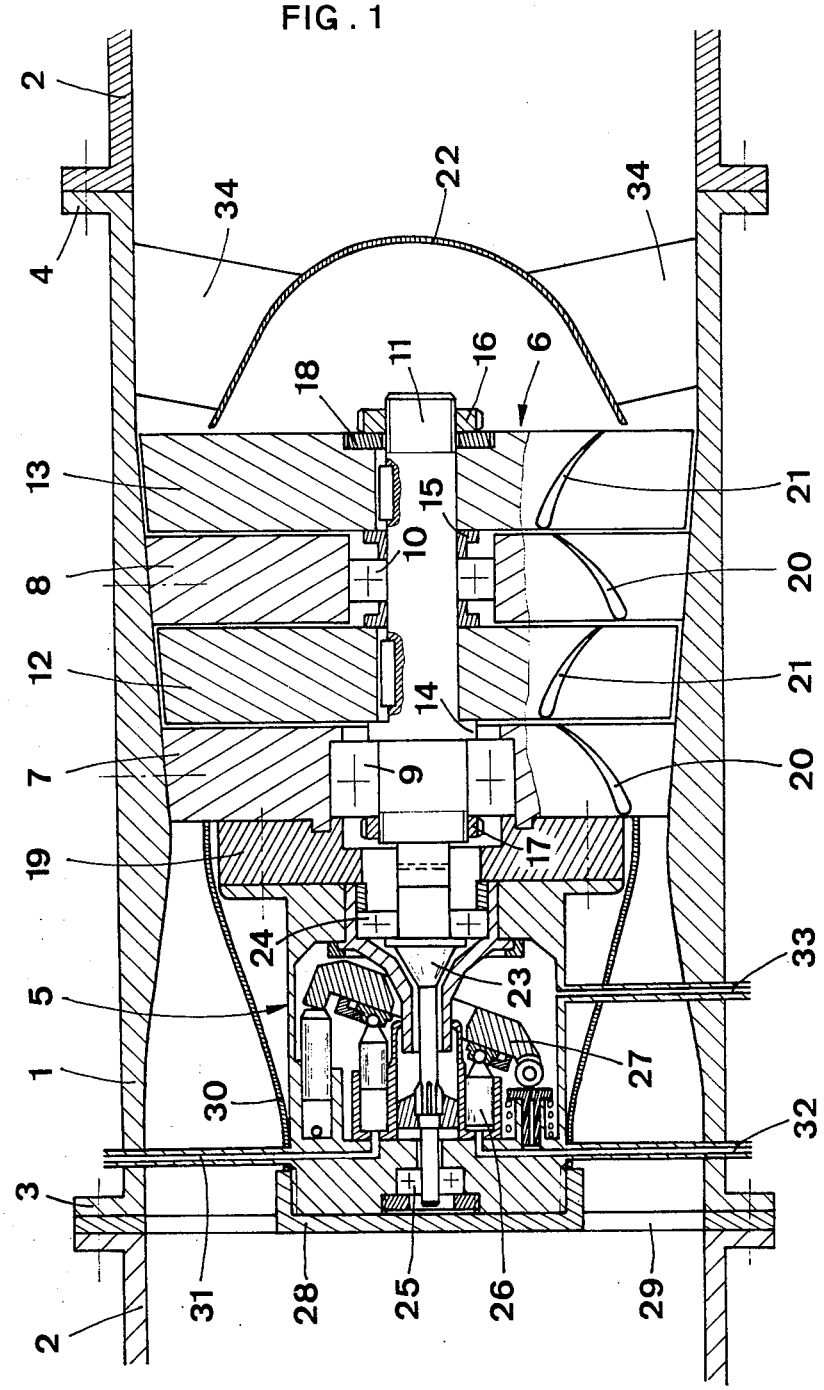
FIG. 1 is a view, substantially in axial section, of an aero-hydraulic generator according to the invention; and, FIG. 2 is a diagram of a heat recovery installation according to the invention wherein the aero-hydraulic generator of FIG. 1 operates as a turbo-pump.

Referring to FIG. 1, an aero-hydraulic generator comprises a sleeve 1 which is capable of being directly inserted into a conduit 2 for a driving fluid, by means of end connecting flanges 3 and 4. Interposed convergent or divergent members free of sealing joints or packings can be used if the conduit 2 is of a diameter different from that of the sleeve 1. Disposed within the sleeve 1 are a positive displacement hydraulic pump 5 which is capable of operating as a motor, and an axial turbine 6 which is capable of operating as an axial compressor.

In the embodiment illustrated, the turbine 6 is a two-stage turbine, each stage comprising two bladed wheels, one of which, namely the stator wheel, is fixed with respect to the sleeve 1, while the other, namely the rotor wheel, is rotatable within the sleeve 1, each stator wheel being disposed on the pump side of its respective rotor wheel. Thus each of the stator wheels 7 and 8 which respectively belong to the first and second stages of the turbine is fixed by way of its periphery with respect to the sleeve 1 and carries a bearing assembly 9 and 10 respectively which form a support bearing for a shaft 11 of the turbine 6. Each of two rotor wheels 12 and 13 is keyed on the shaft 11 of the turbine 6 with the rotor 12 disposed between the stator wheels 7 and 8. The rotor wheels 12 and 13 are positioned axially on the shaft 11 by means of a shoulder 14 on the shaft 11, a bracing member 15, the bearing assemblies 9 and 10 and members 16 and 17 which are screwed onto the ends of the shaft 11, possibly with an interposed packing member such as shown at 18.

The bearing assembly 9 which is also retained by a bracing member 19 which is fixed with respect to the stator 7 and on which the body of the pump 5 is fixed, is a sealed bearing assembly for limiting any leakage which may occur from the pump 5 towards the turbine 6. The internal configuration of the sleeve 1 facing the stages of the turbine is that of a diverging member, with the bladed wheels 7, 12, 8 and 13 increasing in diameter in a corresponding manner. As will be seen from the unsectioned part of the view in FIG. 1, the stator wheels 7 and 8 and the rotor wheels 12 and 13 are respectively provided with blades 20 and 21 which are of an identical profile but have a reversed setting. On the outer end of the turbine 6, there is a cap member 22 supported by support vanes 34 fixed to the sleeve 1.

The shaft 11 of the turbine 6 is directly coupled to a shaft 23 carried by bearing assemblies 24 and 25 of the hydraulic pump 5 which is disposed in front of and in line with the turbine 6.

The pump 5 may be a gear pump, but in order to provide an aero-hydraulic generator which is capable of being adapted to driving fluids which have vapours with different characteristics, the pump 5 is advantageously a variable-output pump such as a pump of the swash-plate kind, with axial pistons 26 and an inclinable plate 27 whose angle of inclination can be adjusted, this kind of pump being well known and is not described in detail here for this reason. A closure member 28, which is retained by transverse members 29 capable of being secured to the sleeve 1 at the level of the front end connecting flange 3, is screwed onto the front face of the pump 5 whose body is surrounded by a front cover member 30 of generally frusto-conical shape which, with a convergent configuration afforded by the sleeve 1 therearound, defines a convergent entry duct into the turbine 6. The pump 5 can draw in hydraulic fluid by way of an inlet conduit 31 and discharge hydraulic fluid under pressure by way of an outlet conduit 32, the conduits 31 and 32 passing through the sleeve 1 in a substantially radial direction. Finally, the body or casing of the pump 5 is apertured in its lower part by an orifice which communicates with the exterior of the generator by way of a drain conduit 33 for discharging hydraulic fluid which results from internal leakage in the pump 5.

The generator whose structure has just been described above operates in the following manner: A driving fluid which comprises steam or cooling fluid vapour, possibly a fluid with a low boiling point, which flows through the conduit 2 from the left towards the right in FIG. 1, will pass axially through the generator, rotating the rotors 12 and 13 of the turbine 6. This rotary movement will be transmitted by the shaft 11 to the shaft 23 of the pump 5 which will produce pressure discharge by way of the conduit 32 of a secondary fluid, in a liquid or vapour state, which is drawn in through conduit 31.

If the cycle is reversed, the generator can function as a motor-compressor unit: the driving fluid being introduced under pressure by way of the conduit 32 to rotate the hydraulic motor 5 whose shaft 23 will drive the shaft 11 of the compressor for compressing a fluid passing through the generator.

Figure 2:
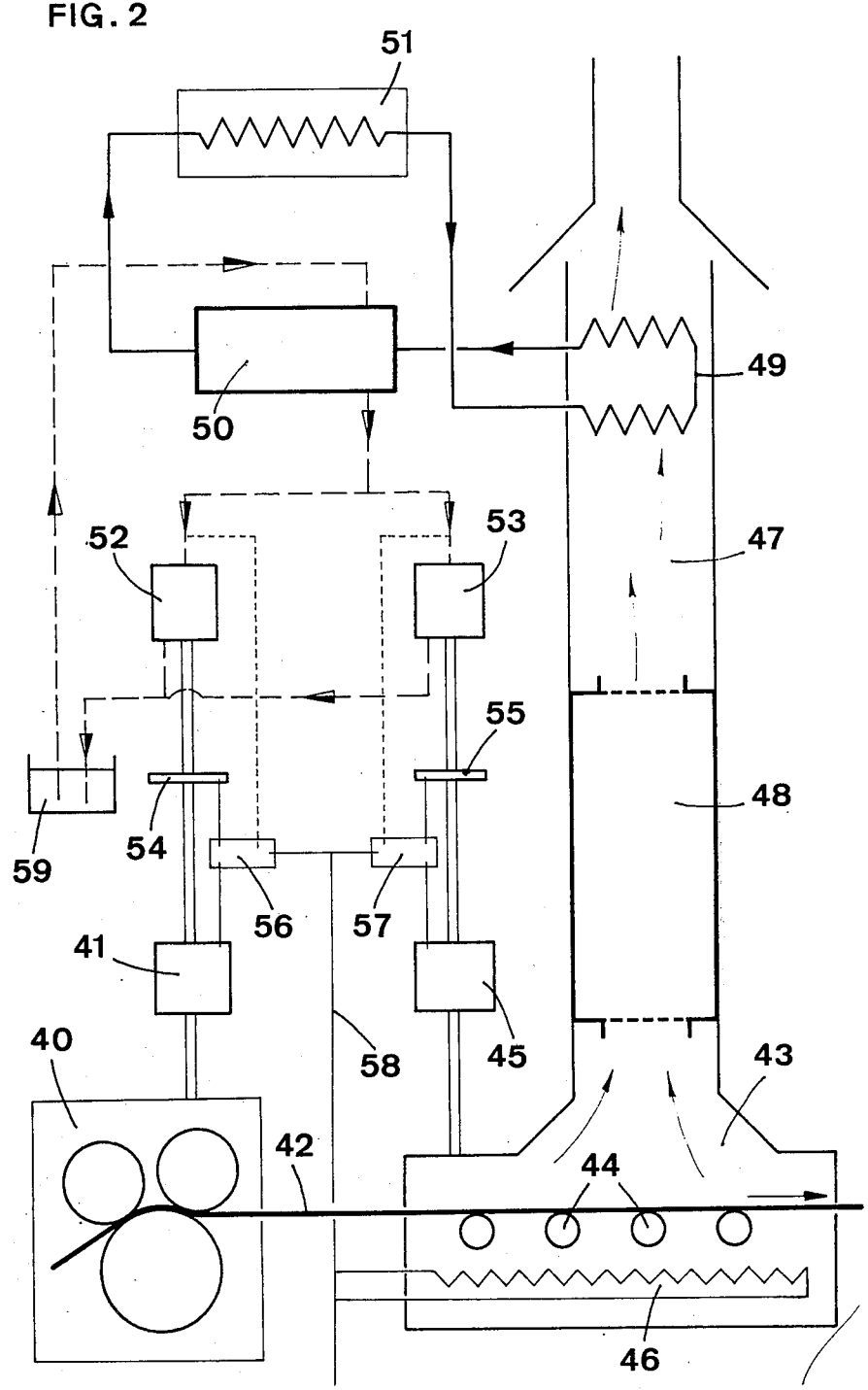

Reference will now be made to FIG. 2 to describe an installation generally described in the present applicants' French Patent Application No. 77/25 293, but in which installation an aero-hydraulic generator as described above has been substituted for a steam turbine associated with an alternator. Referring to FIG. 2, reference numeral 40 generally denotes rotary printing presses of printing equipment, the presses being driven by an electric motor 41. The freshly inked paper 42 is received in a drying oven 43 through which the paper is conveyed by rollers 44 which are driven by an electric motor 45. In the drying oven 43, air is heated, by electrical elements 46, and passes over the inked paper to dry the ink. The hot, dirty and polluted gas and fumes which result from the operation of drying the inked paper pass into a discharge pipe 47 in which there are disposed a cleaning oven 48 of the catalysis oven or pyrolysis oven type, and a heat exchanger 49 through which pass the hot clean gas and vapours issuing from the oven 48. The heat exchanger 49 forms the boiler or evaporator for a driving fluid whose vapour forms the primary fluid which passes through an aero-hydraulic generator 50, of the kind described with reference to FIG. 1, whose turbine it thus drives, before being condensed in a condenser 51, for example of the air cooled kind, from which condenser 51 the driving fluid is again passed to the boiler or evaporator 49 in a closed circuit. The pump of the generator 50, which takes in hydraulic fluid from a reservoir 59, supplies hydraulic fluid under pressure to hydraulic motors 52 and 53 whose shafts can be coupled to the shafts of the electric motors 41 and 45 by means of clutches 54 and 55 respectively actuated by control and actuating units 56 and 57 which can control the supply of electrical power to the motors 41 and 45 from a power line 58, and which control the clutches 54 and 55 in dependence on the hydraulic pressure detected at the inlet of the hydraulic motors 52 and 53.

The power which is available at the shafts of the hydraulic motors 52 and 53 and which is produced by the recovery of heat energy at the exchanger 49 can be used for at least partially providing for the drive for the printing presses 40 and the rollers 44, which makes it possible to economise accordingly on the consumption of electrical power by the motors 41 and 45. At the same time, heat pollution is very substantially reduced, as the vapours or gases discharged from the pipe 47 are clean and substantially cooled.

The uses of the aero-hydraulic generator are not limited to the above-described installation. It could equally well be used instead of the motors or turbines, pumps and alternator described in our French Patent Applications Nos. 77/12146, 77/25294 and 77/32732, and it is also possible to use the generator according to the present invention as a turbo-pump unit or as a motor-compressor unit, in the installations described in the above-mentioned applications.

Generally, the aero-hydraulic generator of the invention can have the advantages of very compact construction, and hence a good power-to-weight ratio, a high degree of simplicity and hence a low production cost, and can have the capability of receiving vapours at low temperatures, within most of the heat energy recovery installations presently known.

I claim:

1. An aero-hydraulic generator operable as a turbo-pump or motor compressor for insertion in a conduit comprising:
   a sleeve housing having a hollow interior and including end connecting flanges at each end of said sleeve, for insertion of said sleeve in said conduit;
   a positive displacement hydraulic pump-motor rotatable within said hollow interior, said pump-motor having a first shaft;
   an axial turbine-compressor having a second shaft connected with said first shaft for connecting said turbine-compressor in tandem with said pump-motor;
   said hydraulic pump-motor and said turbine-compressor being housed within said sleeve housing, so that a first fluid can pass axially of said first and said second shafts through said sleeve housing; and,
   inlet and outlet conduits passing through said sleeve housing in a radial direction free of packings and transverse to said first and said second shaft for passage of a second fluid through said pump-motor without leakage to the exterior of the generator.

2. An aero-hydraulic generator according to claim 1, said turbine comprises at least one pair of bladed wheels including a stator wheel and a rotor wheel each having blades, said stator wheel being disposed on the pump side of said rotor wheel;
   means fixing said stator wheel at its periphery with respect to said sleeve;
   a sealing bearing assembly carried by said stator wheel forming a support bearing for said second shaft; and,
   said rotor wheel being secured on said second shaft, the blades of said rotor wheel being of identical profile but reversed setting as the blades of said stator wheel.

3. An aero-hydraulic generator according to claim 1 or 2, including
   a casing for said pump; and,
   a drain connector for said casing connected to the exterior of said sleeve for discharging hydraulic fluid resulting from internal leakage in said pump.

4. An aero-hydraulic generator according to claim 1, wherein said first fluid can include different types of fluids, said pump being of the variable output type comprising axial pistons and a variably inclinable plate, so that the generator is adaptable to said different types of said first fluids having different vapour characteristics.

5. An installation for recovery of heat energy dissipated by a heat source and transmitted to a boiler or evaporator by a primary fluid, comprising at least one aero-hydraulic generator according to claim 10, wherein
   said first fluid is a primary fluid which drives said turbine for driving said hydraulic pump; and,
   said hydraulic pump supplies said second fluid under pressure to at least one hydraulic motor to present the recovered energy in a mechanical form.

6. An installation according to claim 5, in which
   said heat source is a low-temperature heat source, and said primary fluid is a fluid used for cooling and has a low boiling point.

7. An installation according to claim 5 or 6, in which said installation includes an oven and printing presses,
   said heat source comprises cleaned gases and vapours issuing from said oven which cleans vapors and gases resulting from drying of freshly inked paper originating from said rotary printing presses.

8. An installation according to claim 7, including
   a primary fluid evaporator disposed in a pipe for discharge of the cleaned gases and vapours,
   said pump of at least one of said aero-hydraulic generators included in said installation feeds at least one hydraulic motor drivably connected to said rotary printing presses.

9. A heat energy recovering installation comprising at least one heat pump operable as a reversible aero-hydraulic generator according to claim 1, in which
   said generator operates as a motor-compressor unit,
   said turbine operates as the compressor of the heat pump and is driven by the hydraulic pump which operates as an hydraulic motor, and
   said last-mentioned hydraulic motor being supplied with driving fluid under pressure from a pump external to said generator.

10. A turbine comprising:
    a body member having a hollow interior;
    a rotor in said body member rotatable in said hollow interior;
    an hydraulic pump including an inlet duct and an outlet duct, said inlet duct and said outlet duct pass through said body free of packings and without leakage;

means for coupling said hydraulic pump and said rotor;

a stator cooperating with said rotor, said stator being fixed to the interior of said body member;

a bearing assembly carried by said stator and supporting said coupling means axially within said body member;

a casing for said hydraulic pump coaxial with said coupling means and disposed within the hollow interior of said body member; and a drain conduit passing through said sleeve and connecting the interior of said casing with the exterior of said body member to discharge hydraulic fluid resulting from internal leakage in said pump.

11. The turbine as claimed in claim 10, wherein said coupling means includes common shaft means connecting said rotor and said hydraulic pump.

* * * * *